Figure 1:
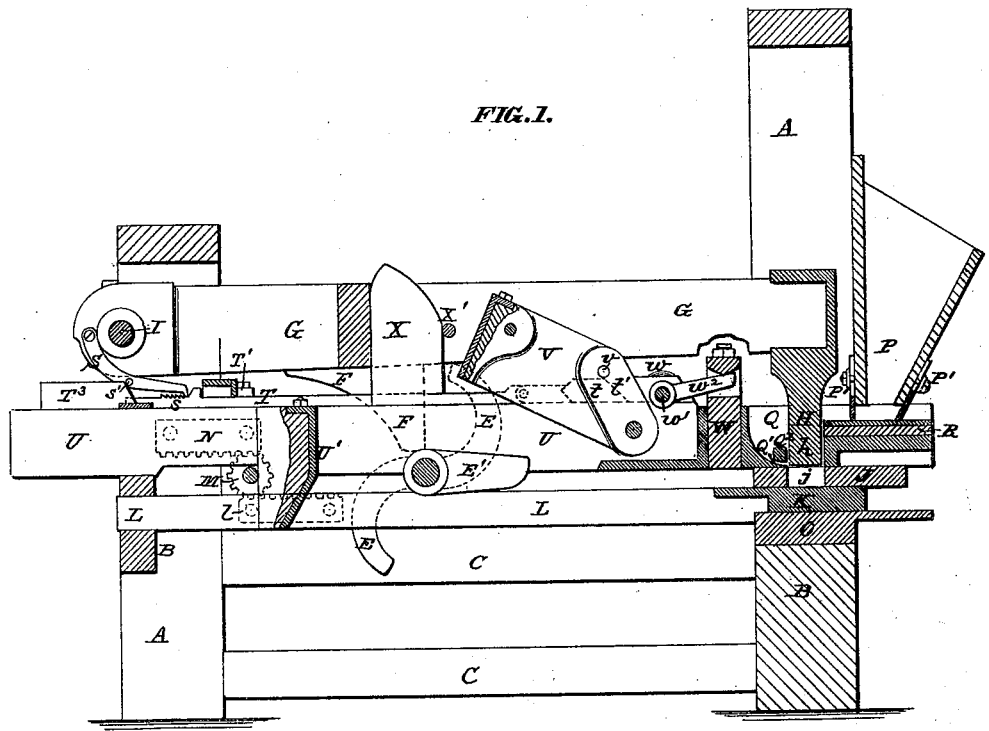

2 Sheets—Sheet 1.

E. F. ANDREWS.
BRICK MACHINE.

No. 179,988. Patented July 18, 1876.

ATTEST:
Robert Burns.
Le Blond Burdett.

INVENTOR:
Edwin F. Andrews
By Knight Bro.
Attys.

2 Sheets—Sheet 2.

E. F. ANDREWS.
BRICK MACHINE.

No. 179,988. Patented July 18, 1876.

ATTEST:
Robert Burns.
Le Blond Burdett

INVENTOR:
Edwin F. Andrews
By Knight Bro.
Atty s

UNITED STATES PATENT OFFICE.

EDWIN F. ANDREWS, OF ST. LOUIS, MISSOURI.

IMPROVEMENT IN BRICK-MACHINES.

Specification forming part of Letters Patent No. 179,988, dated July 18, 1876; application filed June 8, 1876.

*To all whom it may concern:*

Be it known that I, EDWIN F. ANDREWS, of St. Louis, in the county of St. Louis and State of Missouri, have invented certain Improvements in Brick-Machines, of which the following is a specification, reference being had to the accompanying drawings.

This invention relates to that class of brick-machines in which the clay is forced into the molds by a hammer; and this invention consists, first, in the combination, with said hammer, of a fixed bottomless mold and a sliding mold-bottom, arranged underneath the mold. At the proper time said bottom is drawn back, so as to allow the brick to be forced down in front of it out of the mold. It then moves forward again, pushing the brick before it out of the machine.

Secondly, in the combination, with said hammer and fixed mold, of a sliding feeder or hopper, which is moved forward under the clay-hopper, to receive a supply of clay, and drawn back to discharge the clay into the mold; also acting as a hopper to receive the excess of clay left after the brick is formed. The amount of clay taken by said feeder is regulated by providing its horizontal extension, that closes the bottom opening of the clay-hopper, with a vertically-adjustable plate, which can be raised or lowered to regulate the amount of clay taken by the feeder. The clay-hopper is provided with vertically-adjustable slides, so as to be adjusted with said plates.

Thirdly, in the combination with the hammer, fixed mold, feeding-hopper, and sliding mold-bottom, of a plunger, which is arranged at the rear of the feeding-hopper, and which, as said hopper is moved forward, is brought over the mold and under the hammer, from which it receives a blow, so as to force the brick out of the mold.

Fourthly, in the combination, with the helve of said hammer, when provided with a cross-rod, of a plate, projecting up from the sliding frame of the feeder, the top of said plate being formed into a double incline. When said feeder does not fully reach its forward or backward position, the cross-rod will strike on the inclined top of said plate and move the feeder to its proper position, and indicate to the operator that an adjustment of the cam-blocks is required, the faces of said blocks being made adjustable for this purpose.

Fifthly, in the combination, with the sliding frames of the mold-bottom and feeding-hopper, of a cogged rack on each frame, which racks gear with the opposite sides of a pinion on a cross-shaft, secured to the frame of the machine, so that as one frame moves forward the other will move backward, and vice versa.

Sixthly, in forming the rear bottom edge of the feeding-hopper with a knife-edge, which, as said hopper moves forward, shaves the excess of clay from the top of the mold, said knife-edge being protected from an accidental blow of the hammer by a metallic cross-guard, arranged immediately above it.

Seventhly, to a device for regulating the number of blows struck on each brick. This device consists of a sliding bar, the rear end of which is formed with a series of ratchet-teeth, on which acts a pawl, secured to the hammer-helve, so that at each stroke of the hammer the sliding bar will be moved forward the space of one tooth. To the forward end of said bar is pivoted a block, having its forward end inclined so as to pass under a pin secured to a pivoted cam-block, and hold said block out of the way of its cam until said sliding block is moved forward past the pin, to allow the cam-block to drop into position to be acted on by the cam so as to move the feeding-hopper forward. The rear end of said sliding block is inclined so that the pin on the cam-block will pass under it when said cam-block moves forward.

Figure 2:
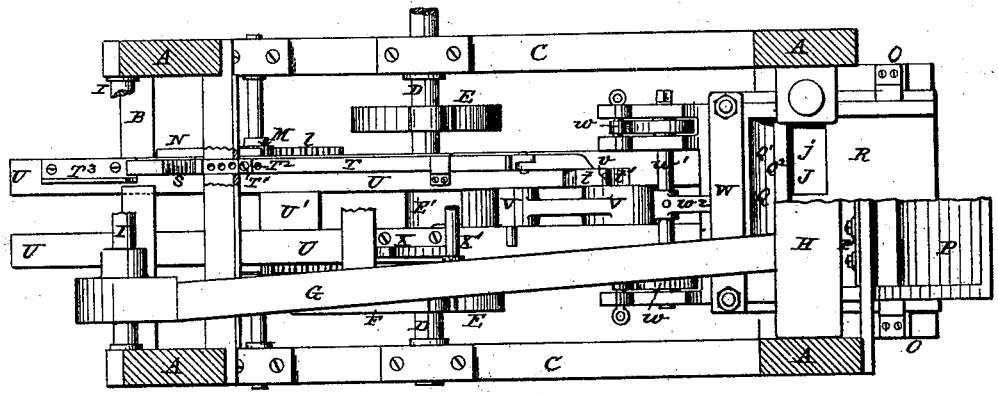
Figure 3:
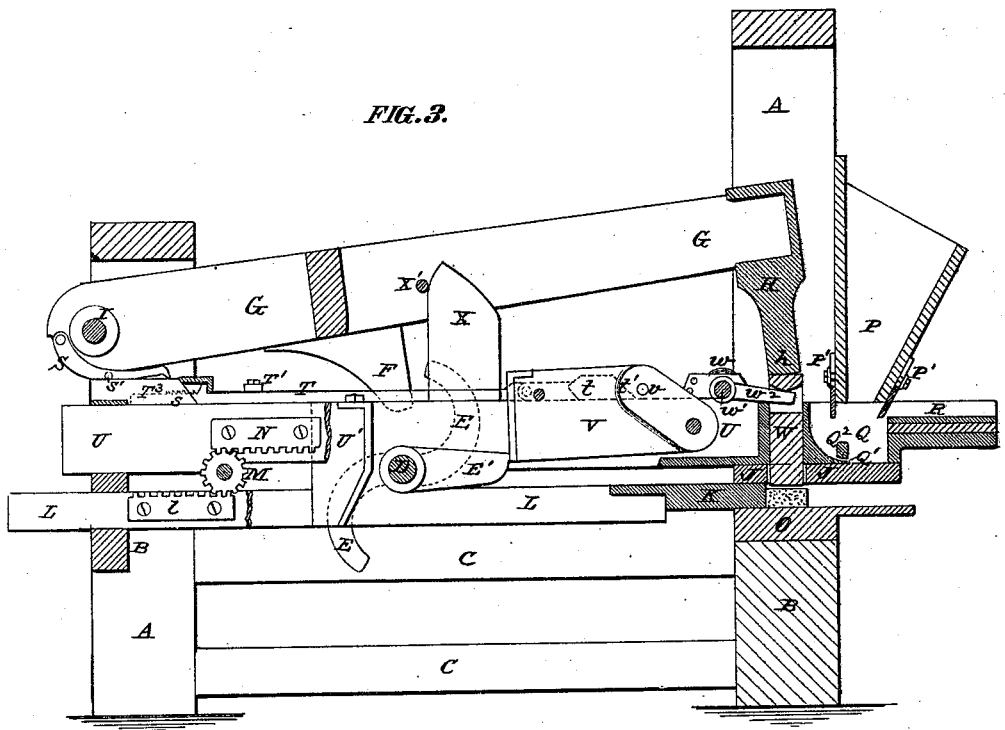

In the drawings, Figure 1 is a longitudinal section, showing the position of parts while the molds are being rammed. Fig. 2 is a top view of same with one-half of hammer removed and posts of main frame in section. Fig. 3 is a longitudinal section, showing the position of parts when the molds are being emptied.

The main frame may be made of any suitable material, such as iron or wood. It has corner-posts A, cross-bars B, and longitudinal bars or rails C. D is the main shaft, carrying two S-formed cams, E, and a central cam, E'. The cams E act upon the under side of the cam-block F, upon the helve-frame G of the hammer H, by which the molds are filled and emptied. The hammer is raised twice for each rotation of the cam-shaft D, to which the power is applied for running the machine. The axis of the helve-frame is a shaft, I, extending transversely across the rear end of the machine. The hammer has a block or face, h, of nearly the area of the brick-mold for each mold. The molds j are in a fixed mold-plate, J, and extend through said plate. The bottoms of the molds are formed by a sliding plate, K, which is beneath the plate J when the molds are being filled, and which is drawn back to allow the vertical discharge of the bricks from the molds. This mold-bottom is upon a sliding frame, L, which is worked by cog-racks l upon it, engaged by spur-wheels M, turned by cog-racks N upon the sides of the feeder-frame U. The arrangement is such that, as the feeder-frame is moving in one direction, the mold-bottom frame is always moving in an opposite direction.

The mold-bottom plate has a depth at least equal to the depth of the mold, and moves between the mold-plate J, above it, and a fixed plate, O, beneath it. The arrangement is such that when the mold-bottom plate K is drawn back so as to open the bottom of the molds, the bricks, being discharged by the proper mechanism, are received upon the plate o, and at the next forward movement of the plate K it pushes the bricks before it from beneath the molds. P is the hopper, beneath which slides the feeder, by which the clay is carried to the tops of the molds. For this purpose, through the rear part of the feeder is a vertical opening, Q, which forms the lower portion of the hopper when the feeder is in its forward position, and receives its charge of clay. When the feeder is in its rear position the opening Q is over the molds, and forms a hopper containing the supply of clay, which is forced into the molds by the repeated blows of the hammer H, which descends into the opening. The fore part of the feeder consists of an adjustable floor, R, which, when the feeder is in its rear position, forms the floor of the hopper P, and by raising or lowering this floor the quantity of clay brought forward at each movement of the feeder may be regulated. The hopper P has at its bottom adjustable plates P', which are adjusted to suit the vertical position of the floor R. When the feeder is in its forward position, and receiving its charge of clay, the bottom of the hopper P is formed by a forward extension of the mold-plate K. S is a pawl, pivoted to the rear end of the helve-frame, which engages a ratchet, s, on the top of the sliding bar T, sliding endwise upon the sliding feeder-frame U. To the forward end of this bar T is hinged an incline block, t, which rests upon the top of the frame U. The block has an incline, $t^1$, upon the upper side at the front end, up which the pin v passes as the block is moved beneath by the action of the pawl S, to raise the cam-block V, and an incline at the rear end at the under side, along which the pin passes to raise the incline block t as the pin is passing beneath it when the frame U is moving forward. $T^1$ is a bolt, screwing into one of the holes $T^2$ in the bar T, and acting as a stop to stay the backward movement of the bar T during the backward movement of the frame U. The initial position of the block t governs the number of blows given by the hammer on each pressing of bricks, and, as the position of the stop on bar T governs the initial position of the block, the hammer may be made to deliver more or less blows on the bricks, as desired. $T^3$ is a bar on the frame U, which, when the frame moves forward, comes under a pin, s', of the pawl S, and holds it out of engagement of the ratchet s. V is a cam-block, hinged to the frame U at its front end. At the side of the block V is a projecting pin, v, which rides upon the inclined block t, and holds up the rear end of the block V out of the course of the cam E', so that said cam is inactive while the cam-block is held up. When the hammer H has made the required number of blows the inclined block t is carried from beneath the pin v, and the cam-block V is allowed to fall into the course of the cam E', which then acts on the cam-block, and the frame U, with the feeder, is carried forward. As the feeder moves forward its knife-edge $Q^1$ cuts off the surplus clay from above the molds J, and carries it back beneath the hopper, to form part of the next charge. $Q^2$ is a metallic cross-guard over the knife-edge $Q^1$, to prevent said knife being accidentally struck by the hammer H, and also to retain the clay under the hammer. This movement carries the frame L and mold-bottom K backward, and brings the plunger W over the molds, so that the next blow of the hammer descends on the plunger and drives it into the molds, to force the bricks therefrom. As the hammer rises the followers are drawn out by springs w, acting through rock-shaft $w^1$ and arm $w^2$. As the frame U moves forward the pin v passes beneath the block t, and escapes beneath the front end of same. The frame U is carried back to its rear position by the action of the cam E' on the cam-block U'. As the frame U moves backward it carries the frame L forward, and, pushing out the last pressing of bricks, the plate K again forms the mold-bottom for the next pressing. As the frame U moves forward the pawl S is raised by a pin, s', upon its side, riding on a rail upon the frame U. X is an incline top standard, which insures the proper positions of the slide U when it is in either its forward or backward position by a cross-bar, X', which descends against the inclines when the frame is out of position, and carries it into its proper position.

It is not intended that the parts X X' shall be generally active, as the working parts before described perform these functions; but the device X X' is provided as a safeguard to prevent breakage from mismatching of parts, and as an indicator of failure of parts to properly perform their offices.

I claim—

1. The combination of hammer H, fixed bottomless mold J, sliding mold-bottom K, cams E', and cam-blocks V and U', substantially as set forth.

2. The combination of hammer H, fixed mold J, sliding bottom K, feeder Q, and hopper P, substantially as set forth.

3. The combination of hammer H, fixed mold J, sliding bottom K, feeder Q, and brick-discharging plunger W, as and for the purpose set forth.

4. The combination of the hammer-helve G, cross-bar X', and plate or standard X, secured to the feeder-frame U, as and for the purpose set forth.

5. The combination of mold J, sliding bottom K, feeder Q, sliding frames L U, pinions M, and racks N $l$, substantially as set forth.

6. The feeder Q, formed with knife $Q^1$, in combination with the guard $Q^2$, and mold J, substantially as set forth.

7. The combination of sliding block $t$, having its forward end $t'$ inclined, in combination with the cam-block V, cam E', hammer H, and mold J, as and for the purpose set forth.

In testimony of said invention I have herewith set my hand.

EDWIN F. ANDREWS.

Witnesses:
SAML. KNIGHT,
ROBERT BURNS.